(12) United States Patent
Iyer et al.

(10) Patent No.: US 6,760,501 B2
(45) Date of Patent: Jul. 6, 2004

(54) DEVICE FOR IMPOSING A FIELD TILT FOR APPROXIMATING THE INHERENT FIELD CURVATURE OF A FOCUSING ELEMENT IN A FREE SPACE OPTICAL DEVICE

(75) Inventors: Rajiv Iyer, Ottawa (CA); Jacques Bismuth, Ottawa (CA)

(73) Assignee: JDS Uniphase Inc., Ottawa (CA)

( * ) Notice: Subject to any disclaimer, the term of this patent is extended or adjusted under 35 U.S.C. 154(b) by 90 days.

(21) Appl. No.: 10/152,733

(22) Filed: May 23, 2002

(65) Prior Publication Data

US 2002/0141687 A1 Oct. 3, 2002

Related U.S. Application Data

(63) Continuation-in-part of application No. 09/729,270, filed on Dec. 5, 2000, now Pat. No. 6,498,872, which is a continuation-in-part of application No. 09/988,506, filed on Nov. 20, 2001, now Pat. No. 6,560,000, application No. 10/152,733.

(60) Provisional application No. 60/293,196, filed on May 25, 2001.

(51) Int. Cl.$^7$ .......................... G02B 6/28; G02B 6/293; G02B 6/35

(52) U.S. Cl. .............................. 385/16; 385/18; 385/24; 385/33; 385/37

(58) Field of Search ............................... 385/16–18, 24, 385/31, 33, 37, 39, 47

(56) References Cited

U.S. PATENT DOCUMENTS

| | | | | |
|---|---|---|---|---|
| 5,153,778 A | * | 10/1992 | Sasian-Alvarado | 359/742 |
| 6,415,080 B1 | * | 7/2002 | Sappey et al. | 385/37 |
| 6,498,872 B2 | * | 12/2002 | Bouevitch et al. | 385/24 |
| 2002/0067887 A1 | * | 6/2002 | Tomlinson et al. | 385/37 |

* cited by examiner

Primary Examiner—Hemang Sanghavi
Assistant Examiner—Omar Rojas
(74) Attorney, Agent, or Firm—Teitelbaum & MacLean; Neil Teitelbaum; Doug MacLean

(57) ABSTRACT

An optical beam path directing system has a field-flattening optically transmissive wedge installed in spatially dispersed beam paths upstream of the planar surface of a micro electro-mechanical switch (MEMS) or liquid crystal array. The parameters of the field-flattening wedge and its location in the diffracted beam paths are defined such that the wedge effectively rotates a 'best fit' planar surface approximation of the curvilinear focal plane of a concave reflector into coplanar coincidence with the optical signal-receiving surface of the MEMS. As a result, loss variation is essentially flat and minimized across the optical signal transmission band.

19 Claims, 12 Drawing Sheets

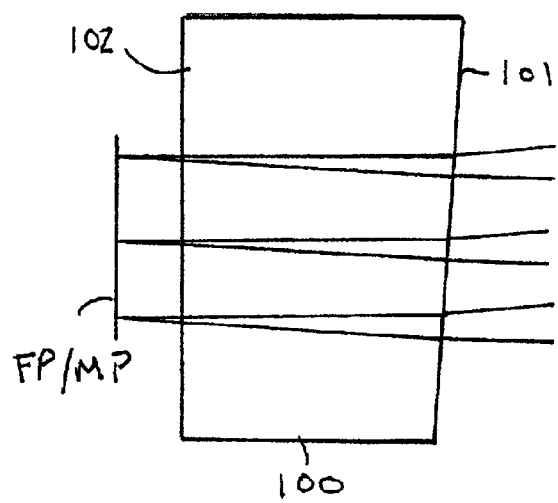
Fig. 14
Fig. 15
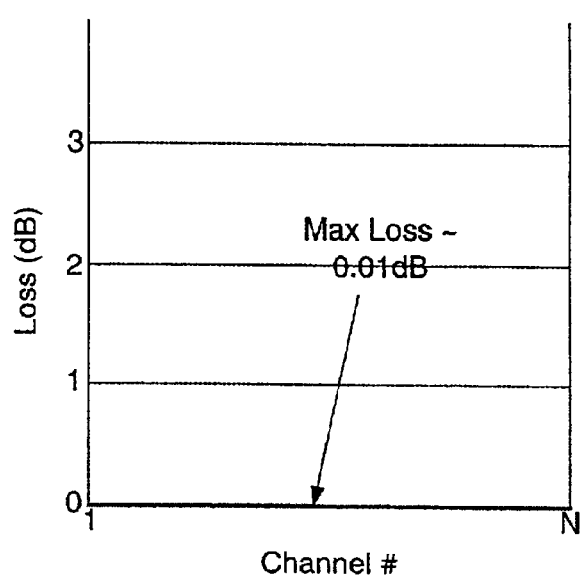

DEVICE FOR IMPOSING A FIELD TILT FOR APPROXIMATING THE INHERENT FIELD CURVATURE OF A FOCUSING ELEMENT IN A FREE SPACE OPTICAL DEVICE

CROSS-REFERENCE TO RELATED APPLICATIONS

The present application is a continuation-in-part of U.S. application Ser. No. 09/729,270, filed Dec. 5, 2000 now U.S. Pat. No. 6,498,872, by Bouevitch et al., entitled: "Optical Configuration for a Dynamic Gain Equalizer and a Configurable Optical Add/Drop Multiplexer" (hereinafter referred to as the '270 application), which is also a continuation-in-part of U.S. application Ser. No. 09/988,506, filed Nov. 20, 2001 now U.S. Pat. No. 6,560,000, by Iyer et al, entitled: "Wavelength Dependent Optical Signal Processing Using an Angle-to-Offset Module," (hereinafter referred to as the '506 application), each of the '270 and '560 applications being assigned to the assignee of the present application and the disclosures of which are incorporated herein.

The present application claims priority from U.S. provisional application Serial No. 60/293,196 filed May 25, 2001, by Iyer and Bismuth also assigned to the assignee of the present application.

FIELD OF THE INVENTION

The present invention relates in general to optical signal processing (e.g., switching) systems and components therefor, and is particularly directed to an arrangement for correcting for the inherent field curvature of a multi-optical signal focusing element, such as a concave mirror, upon the planar surface of an optical signal control (e.g., switching) device, such as a micro electro-mechanical switch (MEMS) or a liquid crystal array. Correction for this field curvature is accomplished by defining an auxiliary focal plane as a 'best fit' approximation of the curved focal plane of the focusing element surface, and positioning the MEMS such that its planar, optical signal-receiving surface intersects the auxiliary focal plane.

In addition, the transmission paths of the optical signals focused by the focusing element are modified, as by means of a transmissive optical wedge, so as to make the auxiliary focal plane effectively coplanar with the optical signal-receiving surface of the MEMS. Such correction is useful in free space devices, such as a configurable optical add/drop multiplexer (COADM), a dynamic gain equalizer (DGE), wavelength blocker or dynamic channel equalizer, a free space switch, or a wavelength switch, where spatially separated beams must be approximately focused on a planar device by an optical element having a curved focal field. It may be noted that two conditions are caused by defocusing at the reflection plane. First, the principal ray is not perpendicular to the processing plane and introduces losses by introducing positional offsets and thus poorly coupling into an output optical fiber. Second, if the beam is defocused at the processing plane, a broader beam (not the focus point) is reflected, so that a broader beam is poorly coupled into the output fiber.

BACKGROUND OF THE INVENTION

As described in the above-referenced '270 application, wavelength division multiplexed (WDM)-based optical communication systems often employ configurable optical add/drop multiplexers (COADMs) to selectively add and/or drop one or more channels (wavelengths) from a composite optical signal stream, as may be transported over a multi-channel optical signal waveguide. As a non-limiting example, FIG. 1 diagrammatically illustrates the general architecture of a COADM of the type disclosed in the '270 application. A COADM is an example of a limited multi-wavelength switch; of course, multiple wavelength switches with larger numbers of channels and greater switching flexibility are also possible.

As shown therein the COADM comprises first and second optical circulators 10 and 20, respectively coupled to first and second optical waveguides 31 and 32, and used to separate in/out and add/drop optical signals. In order to interface external optical channels with respect to the COADM, the first circulator 10 has an input or IN port 11, and an output or OUT EXPRESS port 12. A third port 13 of the circulator 10 is coupled to the first optical waveguide 31. Similarly, the second circulator 20 has an input or ADD port 21, and an output or OUT DROP port 22. A third port 23 of the circulator 20 is coupled to the second optical waveguide 32.

A focusing lens 35 is coupled to focus optical signals transported by waveguides 31 and 32 at the focal plane 45 of the lens 35 to be coincident with a point N of the curved focal field LP of the focusing element 40, such as a reflective surface of revolution, for example, a spherical reflector. Beams 41 and 42 launched from the waveguides 31 and 32 parallel to the axis of the lens 35 (which does not have to be parallel to axis of reflector 40) emerge from the lens 35 to intersect at a focal point N, where the curved focal field LP of the reflector 40 and the focal plane 45 of lens 35 are substantially coincident. Passing through focal point N, beams 41 and 42 define an opening angle γ.

These two beams are reflected from the spherical reflector 40 upon a dispersive element 50 such as a diffraction grating, which spatially disperses the respective optical frequency components of the two beams along different directions in accordance with their various wavelengths components λ. The diffraction grating may be coplanar with, or it may intersect and be oriented at an angle with respect to the focal plane 45. The wavelengths dispersed by the diffraction grating are reflected by the spherical reflector 40, so as to be incident upon the control surface 65 of a beam modifier 60, such as, but not limited to a digitally controlled micro electro-mechanical switch (MEMS) array, such as one containing a one- or two-dimensional M×N distribution micro-mirrors, located in focal plane 45, each micro-mirror being selectively positionable in one of two bistable orientations.

For purposes of a reduced complexity illustration, the MEMS array 60 will be assumed to have a 2×2 bypass configuration associated with the four external ports of the two circulators 10 and 20. Also, in the present example, a respective beam of light includes only first and second wavelengths $\lambda_1$ and $\lambda_2$, although more than two wavelengths are typically used in practice. In a first operational state, the MEMS array 60 is operative to cause an 'express' signal-associated wavelength, contained in the optical signal that is launched into the IN port 11 of the circulator 10, to propagate to the EXPRESS port 12 of the same circulator 10, and a 'drop' signal-associated wavelength signal, that is launched into port 11 of the circulator 10, to propagate to port 22 of circulator 20 in a second operational state. Conversely, a wavelength supplied to port 21 of second circulator 20 propagates to port 22 of the second circulator 20 in the second mode of operation, but is not collected in the first mode of operation.

In operation, an input optical signal beam containing each of the two wavelengths $\lambda_1$ and $\lambda_2$ is launched into the port 11 of the first optical circulator 10 and is circulated thereby to port 12 and coupled to the optical waveguide 31. This multi-wavelength beam of light is transmitted through waveguide 31 and is directed therefrom upon the lens 35 in a direction that is substantially parallel to its optical axis. Lens 35 then directs the light beam to the spherical reflector 40 at Point A, from which the beam is reflected, so as to be incident on the diffraction grating 50 at point B, where it is spatially dispersed into two sub-beams of light respectively corresponding to the two wavelengths $\lambda_1$ and $\lambda_2$. Each of these sub-beams is incident upon points C1, C2 of the spherical reflector 40, and is reflected thereby, so as to be incident upon respective 'micro' reflectors 61-D1 and 62-D2 of the MEMS array 60.

The reflector 61 may be controllably oriented in a first of its two bistable orientations, such that the sub-beam of light corresponding to the first dispersed wavelength $\lambda_1$, is reflected back along the same optical path to the lens 35, enters waveguide 31 again and propagates therethrough to port 13 of the circulator 10, where it is circulated to the OUT/EXPRESS port 12. The reflector 62, however, is oriented such that the sub-beam of light corresponding to the second dispersed wavelength $\lambda_2$ is reflected back along a different optical path. As a consequence, the dropped signal corresponding to the wavelength $\lambda_2$ is returned to the lens 35 via point E of the reflector 40, point F of the diffraction grating 50 and again to point G of the reflector 40, at an angle opposite to its input angle, so that it enters the waveguide 32 and propagates therethrough to the port 23 of the second circulator 20, wherein it is circulated to the OUT/DROP port 22.

Simultaneously with this operation, a second beam of light having wavelength $\lambda_2$ may be supplied as an ADDED input beam into the IN/ADD port 21 of the second optical circulator 20, so as to be circulated to port 23 and coupled to the optical waveguide 32. The second wavelength $\lambda_2$ is transmitted through optical waveguide 32 and directed upon lens 35 in a direction that is substantially parallel to its optical axis. Lens 35 then directs the second beam to point G of the spherical reflector 10, whereupon the second beam is reflected, so as to be incident on point F of the diffraction grating 50, from which it is directed, via the spherical reflector 40 at point E, to the reflector 62 of the MEMS array 60.

The reflector 62 is oriented in one of its two bistable orientations such that the second wavelength beam $\lambda_2$ is reflected back along a different optical path to the spherical reflector 40 at point C2, where it is directed to the diffraction grating 50 at point B. At the diffraction grating, the added optical signal corresponding to the second wavelength $\lambda_2$ is combined (multiplexed) with the express signal corresponding to the first wavelength $\lambda_1$. This multiplexed optical signal is then returned to the lens 35 via point A of the reflector 40, passes into the first optical waveguide 31 and is transported therethrough to port 13 of the first circulator 10, where it is circulated out from the OUT/EXPRESS port 12.

Now although such a COADM architecture is a very effective mechanism for providing precision control of the insertion and removal of selected wavelength components from a composite optical signal beam, it employs a focusing element, such as the spherical mirror 40 or a lens, having a curved focal field. As a result, different channels (wavelengths) are focused by this element at different points on a curved, rather than the planar focal surface FP. This curved focal field surface causes varying amounts of loss to be introduced into the optical channels that are diffracted onto the planar surface of the MEMS, or other planar optical signal control device.

For a further illustration of documentation describing multiplexed optical signal processing systems and components therefor, attention may be directed to the following publications: J. E. Ford, J. A. Walker, "Dynamic Spectral Power Equalization Using Micro-Opto-Mechanics," IEEE Photonics Technology Letters, Vol. 10, No 10, October 1998; J. E. Ford, V. A. Aksyuk, D. J. Bishop, J. A. Walker, "Wavelength Add-Drop Switching Using Tilting Micromirrors," Journal of Lightwave Technology, Vol. 17, No 5, May 1999; and N.A.

Riza, S. Yuan, "Reconfigurable Wavelength Add-Drop Filtering Based on a Banyan Network Topology and Ferroelectric Liquid Crystal Fiber-Optic Switches," Journal of Lightwave Technology, Vol. 17, No. 9, September 1999.

SUMMARY OF THE INVENTION

In accordance with the present invention, the above-described loss variation problem associated with the field curvature of a focusing element, such as a concave (spherical) mirror, of a configurable optical add/drop multiplexer of the type described above, is successfully addressed by defining a 'best fit' planar surface approximation of the curved focal plane of the focusing element, and locating the optical signal processing element (e.g., MEMS or liquid crystal array), so that its planar, optical signal-receiving surface coincides with the 'best fit' planar surface approximation. This is achieved by using a 'field-flattening' element, such as a transmissive optical wedge, installed between the focusing element and the optical signal processing element.

The field-flattening optical wedge functions to modify the paths of the optical signals focused by the focusing element, so that it effectively tilts or rotates the 'best fit' planar surface approximation into coplanar coincidence with the optical signal-receiving surface of the optical signal processing element. With the curvilinear focal surface of the spherical mirror now being transformed into a focal plane, and that plane being coincident with the MEMS array plane, variation in loss (as minimized by the 'best fit' linear approximation of the focal plane) is effectively eliminated.

BRIEF DESCRIPTION OF THE DRAWINGS

FIG. 14 shows an enlarged portion of the transmission wedge and coincident focal planes FP and MP of the COADM of FIG. 13; and FIG. 15 shows the improvement in the loss variation of a COADM that has been augmented to include a field-flattening transmission wedge in accordance of the present invention.

DETAILED DESCRIPTION

Figure 1:
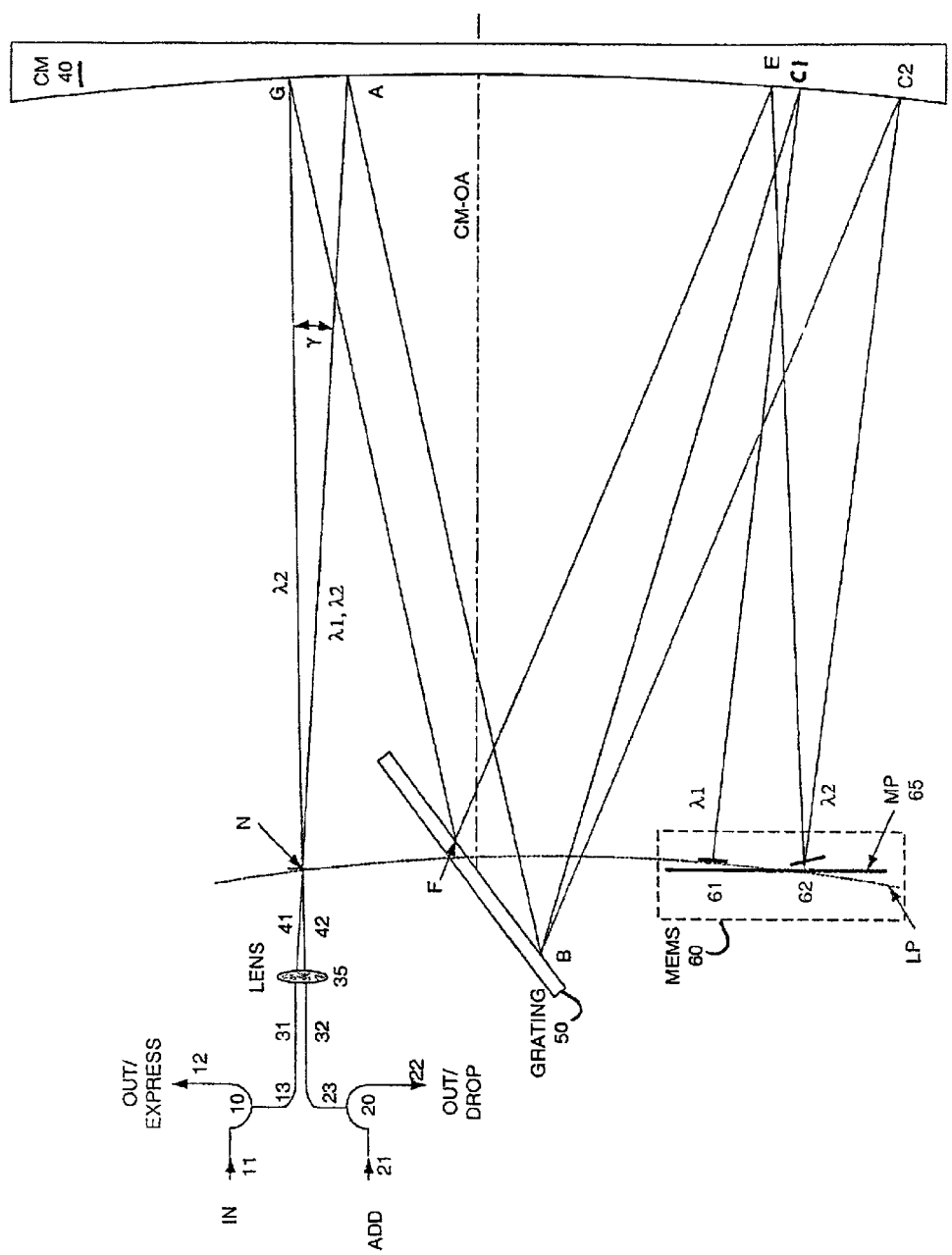
FIG. 1 diagrammatically illustrates the general architecture of a COADM of the type disclosed in the '270 application.

In order to facilitate an appreciation of the field curvature correction mechanism imparted by the improved free-space architecture of the present invention, it is initially useful to examine the spatial geometry characteristics of the various components of which the COADM is comprised. For this purpose, FIG. 2 is a micro-scale geometry diagram associated with the COADM of FIG. 1, showing an effectively planar surface segment of the focal plane 45 of the lens 35 about point N where it is substantially coincident with the focal field of the spherical concave mirror/reflector 40, orthogonal to a Z-axis, the Z-axis being parallel to the optical axis CM-OA of spherical reflector 40.

Figure 2:
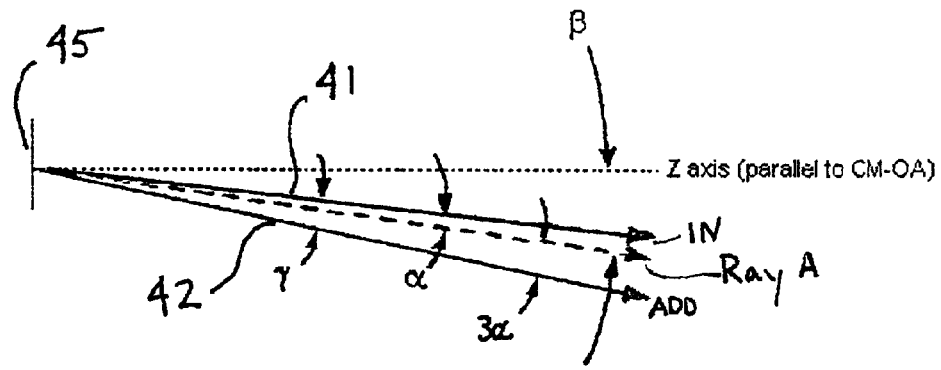
FIG. 2 is a micro-scale geometry diagram associated with the COADM of FIG. 1.
Figure 3:
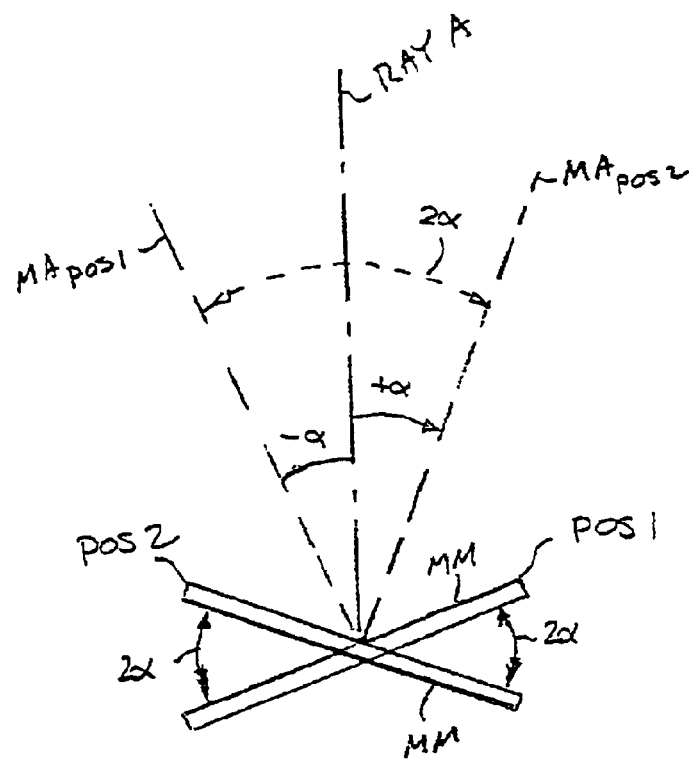
FIG. 3 is a geometry diagram showing bistable orientations of a respective MEMS micro-mirror.

Also shown in FIG. 2 are a pair of respective rays IN and ADD, whose travel directions correspond to the paths 41, 42 of the sub-beams separated by an opening angle γ. In response to a digital control signal applied to the MEMS array 60, a respective micro-mirror is selectively orientable in either of its two bistable mirror positions, shown in FIG. 3 as positions POS 1 and POS 2, and being separated from one another by a prescribed angular separation 2α. Also shown in FIGS. 2 and 3 is a 'bisecting' RAY A, which bisects the angular separation 2α between the two stable orientations of a micro-mirror into a pair of sub-angles +/−α on either side of the bisecting RAY A. At each of its bistable orientations, the planar surface of the micro-mirror is orthogonal to an axial line ($MA_{POS\ 1}$ or $MA_{POS\ 2}$) that defines one of the two angular boundaries of the 2α angular separation—either +α or −α relative to the bisecting RAY A.

As further illustrated in FIG. 2, the 'bisecting' RAY A has an orientation relative to the optical axis CM-OA of the spherical reflector 40 defined as the angle β. Also, the respective rays IN and ADD for the paths 41 and 42 (which are separated from one another by the opening angle γ) may be defined relative to the bisecting RAY A, such that the RAY A lies along a line rotated one-fourth of the opening angle γ from the IN ray to the ADD ray, and is equal to the angle α, so that the angular separation between the ADD ray and RAY A is 3α.

Figure 4:
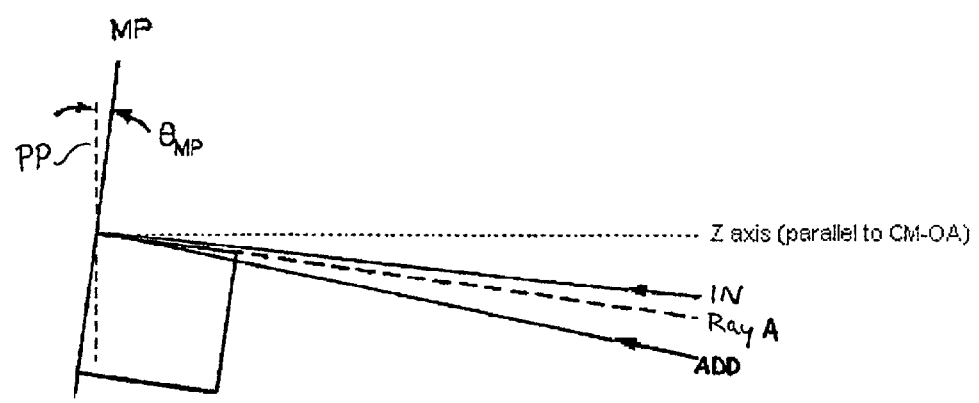
FIG. 4 shows the angular relationship between the mirror plane MP of the MEMS and the optical directions of the ray components of the micro-scale diagrams of FIGS. 2 and 3.

FIG. 4 shows the angular relationship between the mirror plane MP of the MEMS and the optical directions of the ray components of the micro-scale diagrams of FIGS. 2 and 3. In particular, FIG. 4 shows the plane MP being orthogonal to the RAY A, as denoted by the square box 70, and rotated by an angle $\theta_{Mp}$ relative to the an effectively planar surface segment PP parallel to the plane 45 and normal to the z-axis.

Figure 5:
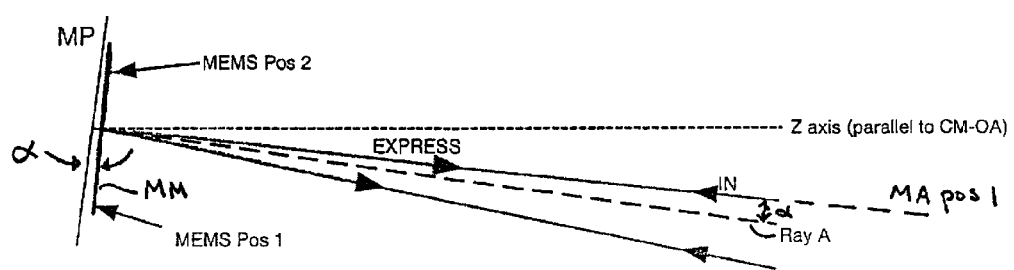
FIG. 5 shows a respective MEMS micro-mirror oriented to a first bistable position POS 1, rotated by an angle +α, counter-clockwise relative to a bisecting RAY A.
Figure 6:
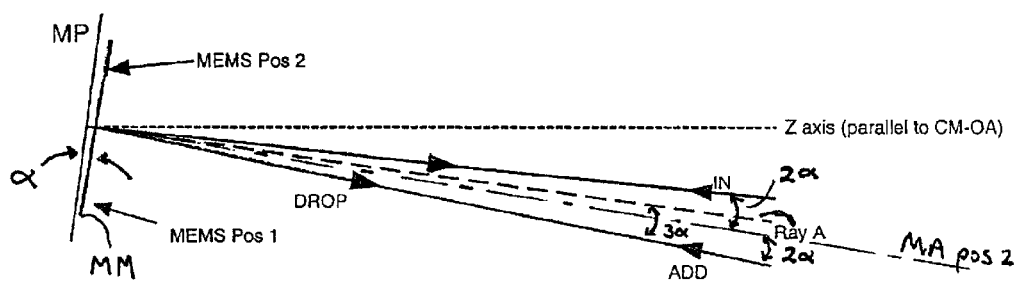
FIG. 6 shows a respective MEMS micro-mirror MM being oriented to a second bistable position POS 2, rotated by an angle -α, clockwise relative to a bisecting RAY A.

FIGS. 5 and 6 are geometry diagrams illustrating the functional operation of a respective MEMS micro-mirror for its two bistable orientations or positions POS 1 and POS 2 (+/−α relative to bisecting RAY A). In particular, FIG. 5 shows a respective MEMS micro-mirror MM being oriented to a first bistable position POS 1, which is rotated by an angle +α, counter-clockwise relative to the bisecting RAY A. As described above, and as shown in FIG. 5, at this first bistable orientation or position POS 1, the planar surface of the MEMS micro-mirror MM is orthogonal to a line $MA_{POS\ 1}$. Since, as shown in FIG. 5, line $MA_{POS\ 1}$ has an angular rotation a relative to RAY A, which makes it coincident with the ray IN, then for normal plane wave incidence upon the micro-mirror MM, the ray IN will be retro-reflected from the micro-mirror MM back along line $MA_{POS\ 1}$, which is coincident with its direction of incidence and returned to the OUT EXPRESS port 12 of the circulator 10, as described above with reference to FIG. 1.

FIG. 6 shows a respective MEMS micro-mirror MM being oriented to the second bistable position POS 2, which is rotated by an angle −α; clockwise relative to the bisecting RAY A. As described above, at this second bistable orientation or position POS 2, the planar surface of the MEMS micro-mirror MM is orthogonal to line $MA_{POS\ 2}$ that defines one of the two angular boundaries of the 2α angular separation (−α relative to the bisecting RAY A). As shown in FIG. 6, since line $MA_{POS\ 2}$ has an angular rotation α (clockwise as viewed in FIG. 6) relative to RAY A, it is rotated by an angle 2α relative to the ray IN.

As a consequence, for equal angles of incidence and reflection relative to a line normal to the micro-mirror MM, the ray IN will be reflected from the micro-mirror MM along an angle 2α (clockwise, as viewed in FIG. 6) relative to the normal $MA_{POS\ 2}$ to the mirror surface or 4α relative to the ray IN, namely along the path of the ADD beam. Therefore, the RAY IN will be directed to the OUT DROP port 22 of the second circulator 20. Simultaneously with this operation for mirror position POS 2, the ADD beam will be deflected by an angle 4α (counter-clockwise as viewed in FIG. 6) relative to the ray ADD, so that it will returned along the same path of the IN beam and coupled to the OUT EXPRESS port 12 of the circulator 10.

Figure 7:
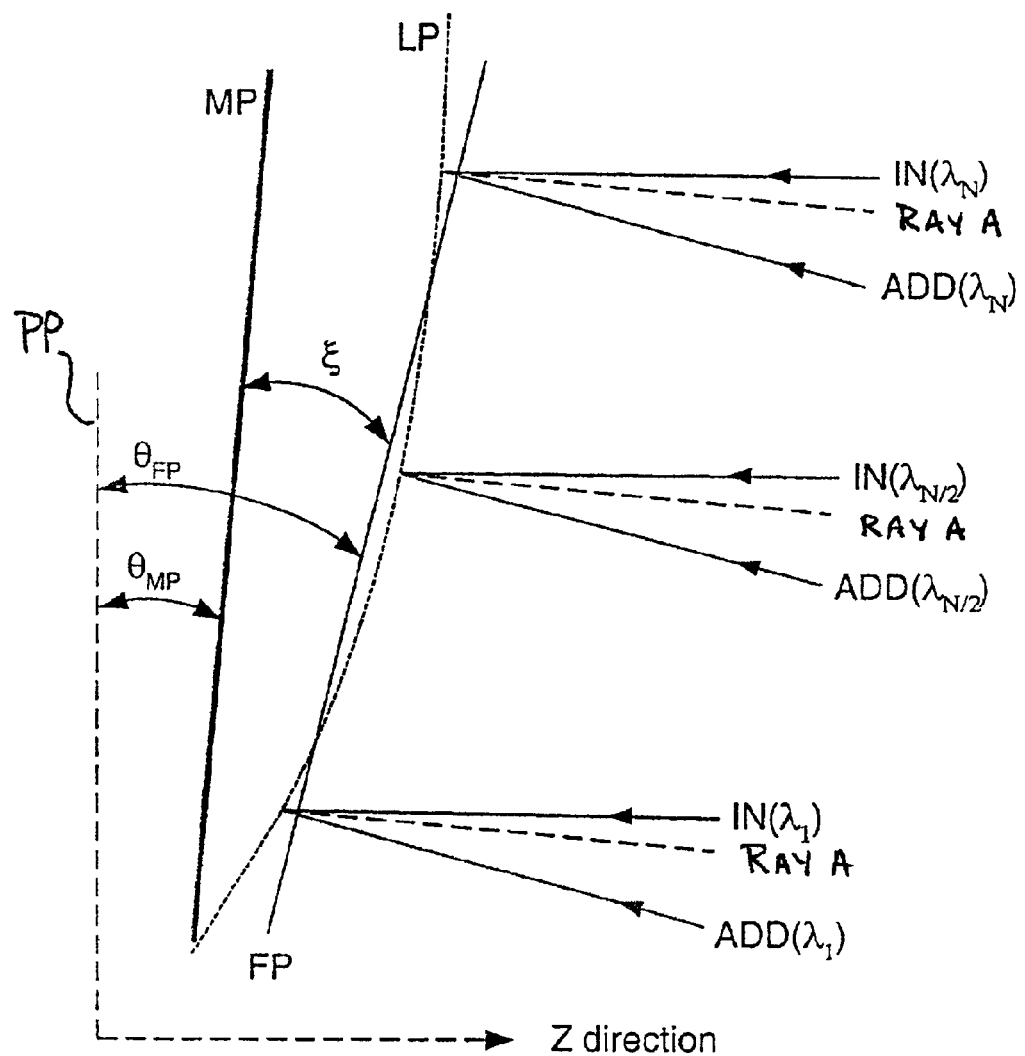
FIG. 7 is a geometry diagram showing a curved focal field produced by a spherical mirror or a mirror having a surface of revolution of another conic section (henceforth all non-spherical reflectors are referred to as aspherical)

As pointed above, and as shown in the geometry diagram of FIG. 7, the focal field LP of the (spherical/aspherical) mirror 40 is not truly planar, but is a curved focal field LP formed of a curvilinear locus of points of the intersections of each ADD ray and its associated IN ray for respective wavelengths $\lambda_1$ and $\lambda_2$ within the optical signal band. This curved focal field LP introduces varying amounts of loss into the optical channels that are diffracted onto the micromirrors of the MEMS 60 by the diffraction grating 50.

Pursuant to a first aspect of the invention, this loss variation problem is addressed by defining a 'best linear fit' planar surface approximation FP to the curved focal plane LP of the focusing element (e.g., the spherical mirror 40).

The linearized focal plane FP may be readily deterministically generated, in accordance with the various geometry parameters of the COADM, including the size and focal length of the spherical mirror, beam dispersion aperture, size of the MEMS, etc., using conventional optics transformation and linearization algorithms.

As shown in FIG. 7, due to the field curvature introduced by the concave (spherical) mirror 40, the linearized best fit focal plane FP is rotated by an angle $\theta_{FP}$ relative to a plane PP parallel to the plane 45 and normal to the Z-axis, which is different from the angle $\theta_{MP}$ of the mirror plane MP of the MEMS, producing a differential angle $\zeta$.

Figure 8:
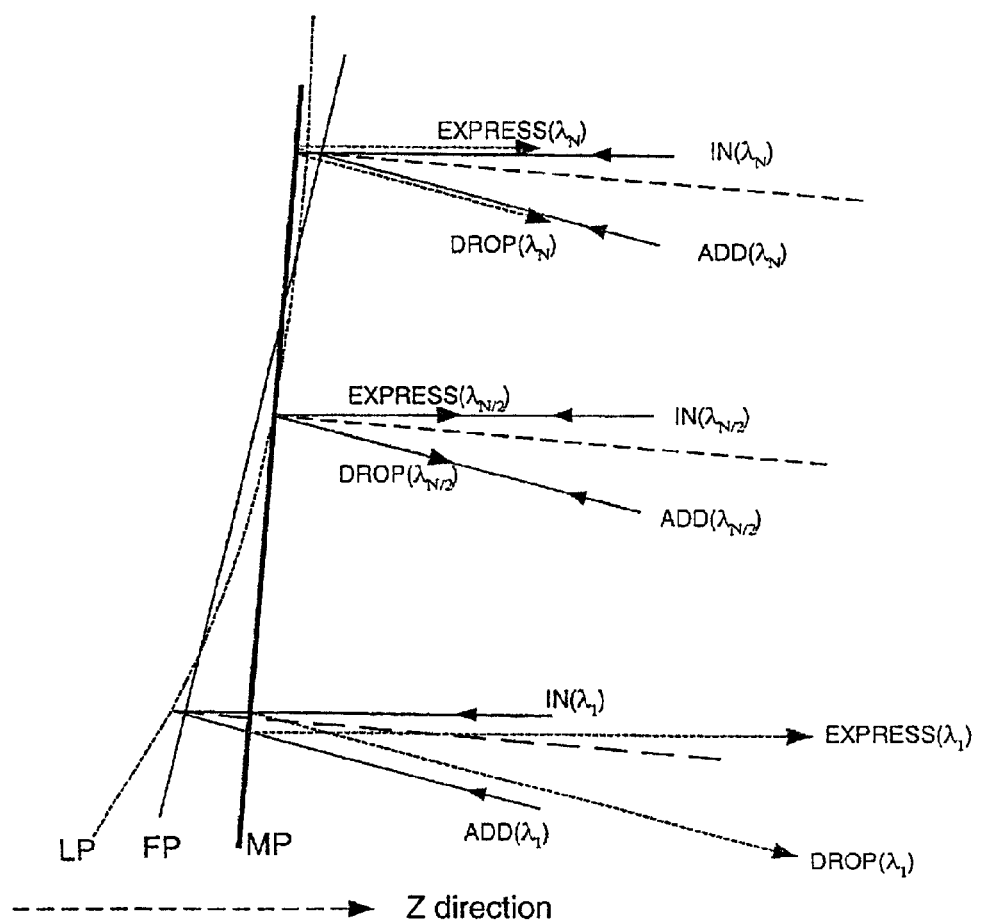
FIG. 8 shows the displacement of a MEMS in the Z direction, so that its planar, optical signal-receiving surface MP intersects the curvilinear focal plane LP of a spherical mirror.
Figure 9:
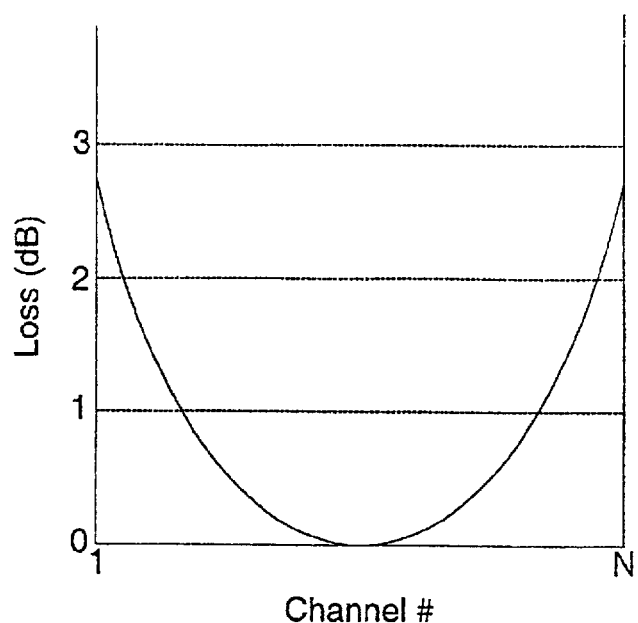
FIG. 9 is a loss vs. channel diagram associated with the operation of a COADM without correction of the present invention.

As further shown in FIG. 8, the optical signal processing element (e.g., the MEMS) can be displaced along the Z direction, so that its planar, optical signal-receiving surface MP intersects the curvilinear focal plane LP of the spherical mirror 40. At any arbitrary intersection of the two surfaces, all wavelengths except one will have their deflected beams displaced from their optimal location (for the second mirror position POS 2), which produces a wavelength-dependent loss of several dB, as shown in FIG. 9. By adjusting the Z-axis location of the mirror surface MP of the MEMS, this loss can be minimized for a selected channel (wavelength). In the loss vs. channel diagram of FIG. 9, the middle channel has its loss minimized for IN-to-DROP and ADD-to-EXPRESS beams.

Figure 10:
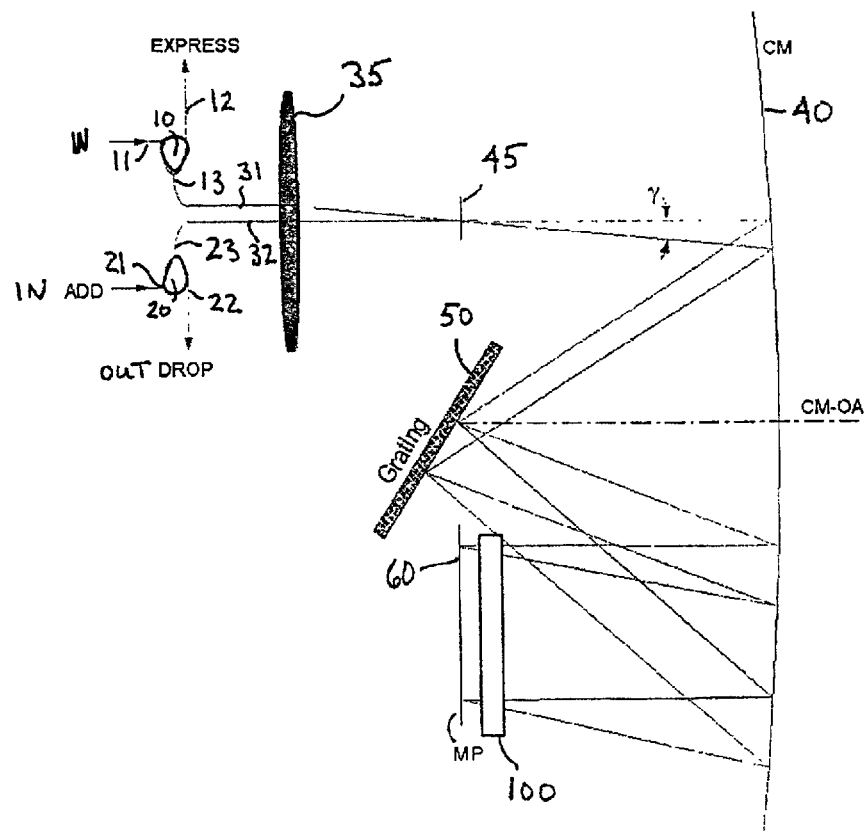
FIG. 10 diagrammatically illustrates a COADM augmented to include a transmission path correction element installed between a concave mirror and a MEMS array in accordance with the invention.

In accordance with a second aspect of the invention, shown in the COADM diagram of FIG. 10, a transmission path correction element 100 is installed between the focusing element (the spherical mirror 40) and the optical signal processing element (MEMS array 60). The purpose of this correction element is to modify the paths of the optical signals focused by the concave mirror 40, so as to effectively rotate the 'best fit' planar surface approximation FP into coplanar coincidence with the optical signal-receiving surface MP of the MEMS array. Non-limiting examples of a suitable (field-flattening) transmission path correction element that may be used for this purpose include a portion or segment of a cylindrical lens and an optical transmission wedge. With the curvilinear focal surface LP of the spherical mirror being transformed into a focal plane FP, and with that plane FP being coincident with the MEMS array plane MP, variation in loss (as minimized by the 'best fit' linear approximation of the focal plane) will be effectively eliminated.

Although a portion of a cylindrical lens could be used to effect the desired field-flattening effect, it may be noted that in the beam transmission region of interest, which is displaced from (or off-axis relative to) the optical axis CM-OA of the spherical mirror 40, the field curvature of the mirror is very nearly linear. As a consequence, in order to not add power to the beams, so that they may properly image back into the coupling fibers 31 and 32, it is preferred that a transmission wedge, shown in FIG. 11A, having an index of refraction N and a wedge angle $\Phi$, be employed as the transmission path correction element 100. A wedge having a curvature in either or both dimensions may also be used as shown in FIGS. 11B and 11C. Because the beam modifier 60 is reflective, a correction element 100 can be introduced which, for example, has a substantially equal curvature on a front (101) and rear (102) surface, so that after both passes, substantially no optical power is introduced. This offers additional design freedom. Since the transmission path correction element 100 operates on a change of optical path length, more complex index grading, for instance in optical polymer, can also be envisioned.

The differential angle $\zeta$ between the angle $\theta_{FP}$ of the linearized best fit focal plane FP and the angle $\theta_{MP}$ of the mirror plane MP of the MEMS may be reasonably well approximated in terms of the parameters of the transmission wedge (specifically, index of refraction N and wedge angle $\Phi$ as follows:

$$\tan(\zeta)=\tan(\zeta_0)*\cos(\Phi)/\cos\Phi'-\sin(\Phi)/\cos(\Phi')*(1-n^2)/n,$$

where $\zeta_0$ is the angle between the focal planes FP and MP without a correction wedge (i.e., the initial field curvature error), and $\Phi$ is the angle of refraction introduced by the wedge.

Figure 12:
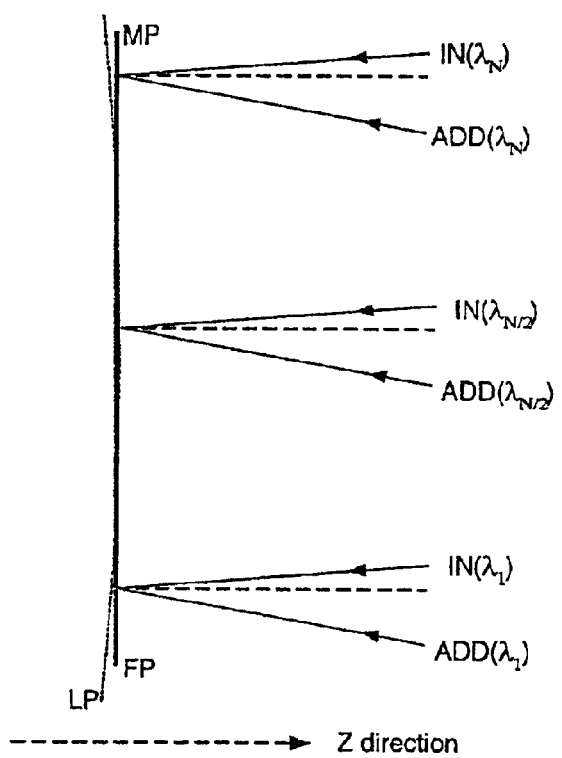
FIG. 12 is a geometry diagram of a unique solution for the parameters of the wedge of FIG. 11 including its Z axis placement.

FIG. 12 is a geometry diagram of a unique solution for the parameters of the wedge including its Z axis placement, where $\theta_{FP}$ and $\theta_{MP}$ are perpendicular to the optical axis CM-OA of the spherical mirror 40.

Figure 13:
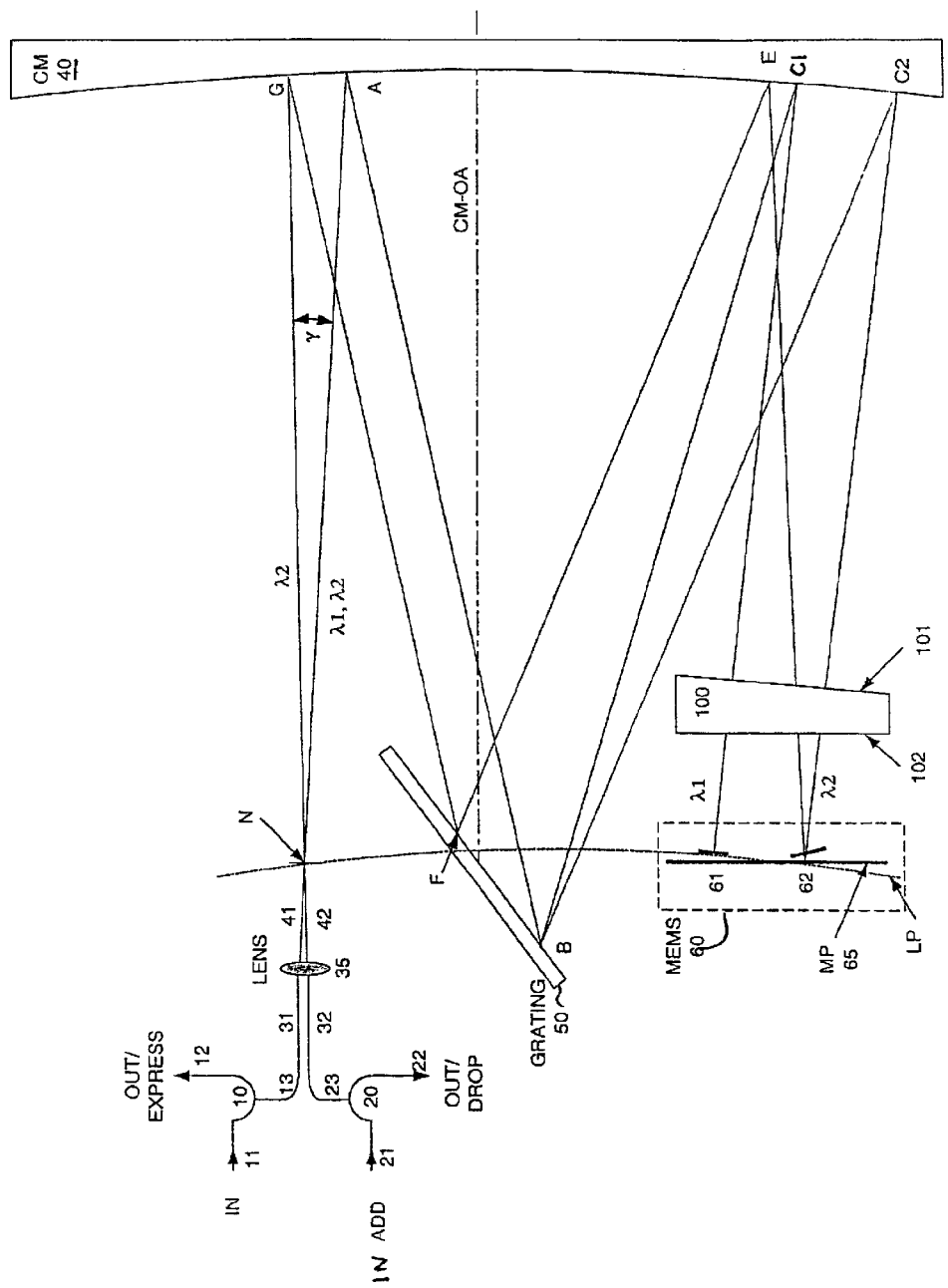
FIG. 13 diagrammatically illustrates the manner in which the COADM of the type shown in FIG. 1 may be augmented to include the field-flattening transmission wedge of FIGS. 11 and 12.

FIG. 13 diagrammatically illustrates the manner in which the COADM of the type shown in FIG. 1, described above, may be augmented to include a field-flattening transmission wedge 100 in accordance with the present invention, while FIG. 14 shows an enlarged portion of the field-flattening wedge and coincident focal planes FP and MP of the diagram of FIG. 13.

As shown therein, the transmission wedge 100 has its front surface 101 (facing the direction of incidence of the optical signals from the spherical mirror) oriented at an acute wedge angle $\Phi$ relative to a plane that is perpendicular to the Z axis. The rear surface 102 (facing the MEMS) of the wedge is perpendicular to the Z-axis. As a result, the wedge modifies the transmission paths of the incident wavelengths such that they focus upon a plane that is parallel to the overlapping focal planes MP and FP.

FIG. 15 shows the improvement in the loss variation of a COADM that has been augmented to include a field-flattening transmission wedge in accordance of the present invention. As shown therein, the loss variation is substantially flat across the entirety of the transmission band, having a minimized level on the order of only 0.01 dB.

As will be appreciated from the foregoing description, the loss variation problem associated with the field curvature of a focusing element of a configurable optical add/drop multiplexer is successfully obviated in accordance with the present invention, by installing a transmission path correction element, such as a transmissive optical wedge, between the focusing element and the planar surface of a micro electromechanical switch (MEMS). The parameters of the 'field-flattening' wedge and its location in the diffracted beam paths are defined such that the wedge effectively rotates a 'best fit' planar surface approximation of the curvilinear focal plane of the focusing element into coplanar coincidence with the optical signal-receiving surface of the MEMS. What results is a minimized loss variation that is essentially flat across the optical signal transmission band.

Figure 16A:
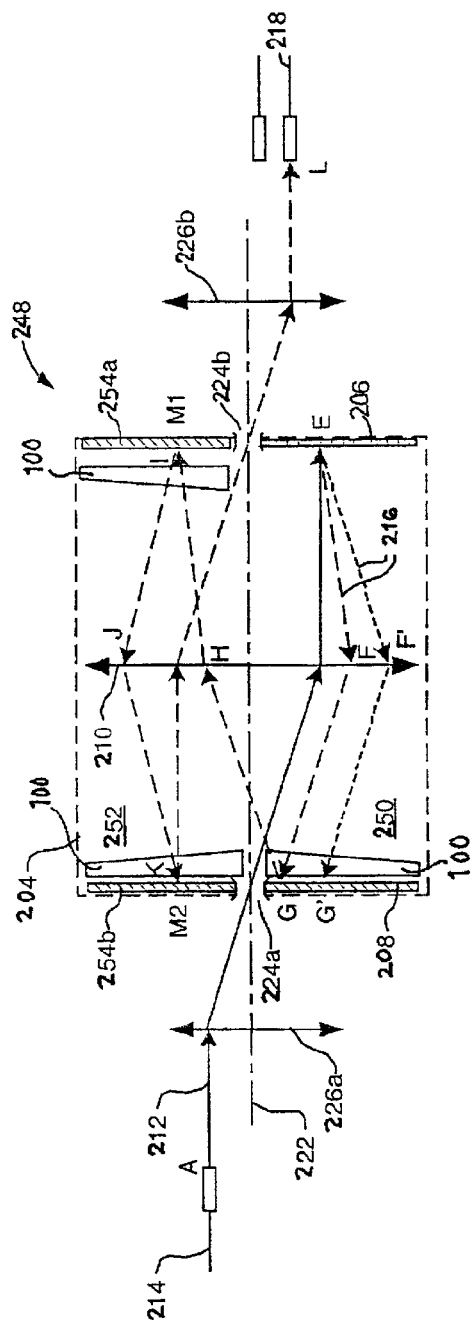
FIGS. 16A and 16B show a demultiplexing wavelength switch incorporating the field curvature correction element in accordance with the present invention.

The field curvature correction is shown in a further aspect of the invention as applied to a demultiplexing wavelength switch 248 shown in FIG. 16A. The wavelength switch 248 is composed of a wavelength demultiplexer 250 (positioned below the optical axis 222 in FIG. 16A), in combination with an optical switch 252 (positioned above the optical axis 222 in FIG. 16A). The optical switch 252 is composed of a pair of substantially planar arrays 254 of independently controllable deflectors, such as MEMs mirrors, or liquid crystal reflectors disposed in or near opposite focal 'planes' of the ATO (angle-to-offset) element 210. ATO element 210 is shown here as a transmissive lens which corresponds in functionality to reflective element 40 of the COADM previously described. The focal field curvature of the ATO element 210, however, again introduces loss at the planar deflectors 254 and reflector 208. The introduction of transmission path correction elements 100 before each of the reflection planes will greatly improve the coupling efficiency of the wavelength switch 248.

Operation of the embodiment of FIG. 16A to switch each channel of a received WDM light beam 212 is shown by the solid and dashed lines of FIG. 16A. For ease of illustration, the multiplexed WDM light beam 212 is illustrated by a solid line, while demultiplexed channel light beams 216 are shown as dashed lines. Similarly, for ease of illustration, the WDM light beam 212 is considered to be composed of two channels, only one of which is traced through the wavelength switch 248 to a selected output waveguide 218. It will be appreciated, however, that more than two channels per WDM light beam 212 can be readily accommodated by the present invention. Thus, the WDM light beam 212 enters the wavelength switch 248 through a respective input waveguide 214 (at A) and propagates through the optical core 204 to the dispersion element 206 (at E). Since, in this embodiment, the input beam 212 only reflects off the dispersion element 206 at one point, no transmission path correction element 100 is placed before it. Each channel light beam 216 propagates away from the dispersion element 206 at a unique angle, and passes through the ATO element 210 (at F and F') which deflects the channel light beams toward the reflector 208.

The reflector 208 may be provided as a simple fixed mirror (having one or more fixed reflective surfaces) designed to reflect incident channel light beams 216 through a common angle in ($\theta y$) out of the dispersion plane of the dispersion element 206, and at unique angles for each wavelength in the dispersion plane ($\theta x$) in order to maintain the wavelength separation. Thus a channel light beam 216 is reflected by the reflector (at G and G') and passes through the ATO element 210 (at H), which images one channel light beam 216 onto a predetermined mirror M1 (at I) within a first MEMS array 254a. Since all of the optical elements between the input waveguide 214 and mirror M1 are fixed, mirror M1 will be associated with one channel of the input waveguide 214, and receives only that one channel light beam 216. However, mirror M1 is also independently movable to a plurality of positions to deflect the channel light beam 216 to any one of the mirrors of the second MEMS array 254b on the opposite side of the ATO element 210. Each mirror of this second MEMS array 254b is associated with one respective output waveguide 218, and is independently movable to deflect a light beam received from any mirror of the first MEMS array 254a into that output waveguide 218. Thus in the embodiment of FIG. 16A, the channel light beam 216 can be switched into any output waveguide 218 by controlling mirror M1 to deflect the channel light beam 216 through the ATO element 210 (at J) to the associated mirror (M2 at K) associated with the selected output waveguide 218. Mirror M2 is then controlled to deflect the channel light beam 216 to the output waveguide 218 (at L) via the ATO element 210, output optical bypass 224b and output relay lens 226b. Associated with each MEMs plane 254 and reflector 208 is a correction element 100 providing field tilt correction as described above.

Figure 16B:
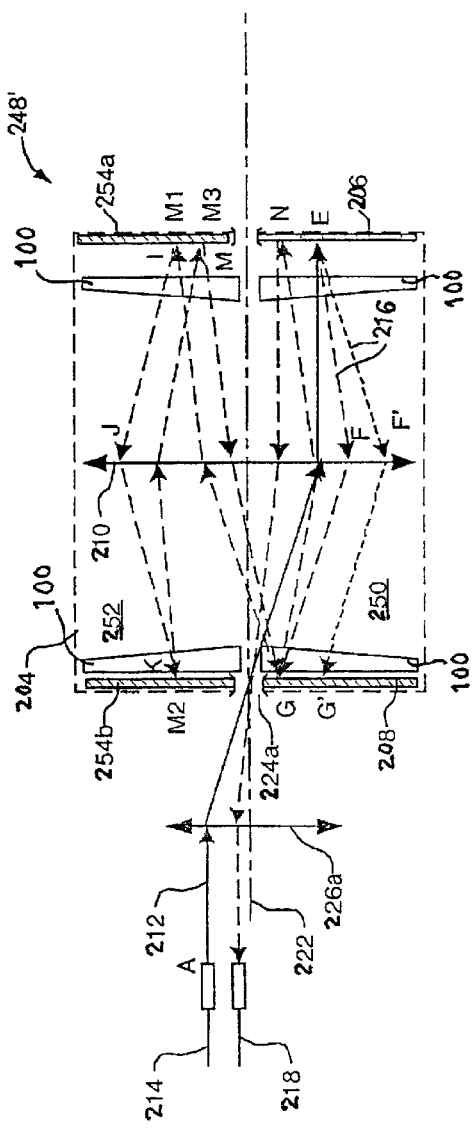

The embodiment of FIG. 16B is similar to that of FIG. 16A, with the exception that the propagation path of each channel light beam 216 includes a second reflection from the dispersion element 206 to achieve flat-top performance and to remultiplex the outputs. Thus mirror M2 deflects the channel light beam 216 to a third mirror (M3 at M) within the first MEMS array 254a. Mirror M3 then deflects the channel light beam 216 back through the ATO element 210 to the reflector 208 (at G), which then reflects the channel light beam 216 to the dispersion element 206(at N). The second pass to a second location on the dispersion element 206 necessitates a fourth field tilt correction element 100, as shown. The channel light beam 216 is reflected by the dispersion element 206, and then passes through the ATO element 210, optical bypass 224a, and relay lens 226b before reaching the selected output waveguide 218.

In this embodiment, the first MEMS array 254a must include at least two mirrors (M1 and M3) for each channel. In this case, mirror M1 is associated with one input waveguide 214 (as described above), while mirror M3 is associated with one output waveguide 218. Mirror M2 is associated with mirror M1, and is used to switch the channel light beam received from M1 to M3 in order to select the desired output waveguide 218.

As may be seen in FIG. 16B, between mirror M3 and the output waveguide 218, each channel light beam follows a "reverse" path through the demultiplexer section 250 of the wavelength switch 248'. As mentioned previously, such a reverse path yields a multiplexing function, so that multiple channel light beams 216 can be multiplexed into the output waveguide 218. This contrasts with the embodiment of FIG. 16A, in which each channel light beam 216 exits the wavelength switch 248 via a respective output waveguide 218.

While we have shown and described two embodiments in accordance with the present invention, it is to be understood that the same is not limited thereto but is susceptible to numerous changes and modifications as known to a person skilled in the art. We therefore do not wish to be limited to the details shown and described herein, but intend to cover all such changes and modifications as are obvious to one of ordinary skill in the art.

What is claimed:

1. For use with a system for directing free space optical signals upon respective spatial locations of a surface of an optical signal processing device, said system including a focusing element that focuses respective optical signals onto a focal surface having a shape that does not conform with the shape of said surface of said optical signal processing device, a method of correcting for the non surface-conformal focusing of said respective optical signals by said focusing element comprising the steps of:

(a) defining a planar auxiliary surface that approximates said focal surface and also conforms with said shape of said surface of said optical signal processing device; and (b) positioning said optical signal processing device relative to said focusing element, whereby the planar auxiliary surface intersects said surface of said optical signal processing device; and (c) modifying transmission paths of said respective optical signals focused by said focusing element, which effectively rotates the auxiliary surface, such that the optical signals are focused on said auxiliary surface in effective coincidence with said surface of said optical signal processing device.

2. The method according to claim 1, wherein said system includes an optical switching device.

3. The method according to claim 2, wherein said switching device is selected from: a multiport wavelength switch, a wavelength blocker, a free space switch, a configurable add-drop multiplexer, a dynamic gain equalizer and a dynamic channel equalizer.

4. The method according to claim 1, wherein step (c) comprises directing said respective optical signals onto said surface of said optical signal processing device, through a refracting element having a prescribed shape and selected index of refraction.

5. The method according to claim 4, wherein said refracting element comprises an optically transmissive wedge.

6. The method according to claim 1, wherein said surface of said optical signal processing device is a planar surface, said focal surface has a curved shape, and said auxiliary surface is a planar surface having a prescribed fit to said curved shape of said focal surface.

7. The method according to claim 6, wherein said focusing element is a reflective surface of revolution about an optical axis thereof, and step (c) comprises modifying transmission paths of said respective optical signals focused by the focusing element, effectively translating and tilting said substantially planar auxiliary surface, such that said respective optical signals are focused on said planar auxiliary surface in effective coincidence with said planar surface of said optical signal processing device.

8. The method according to claim 7, wherein step (c) comprises directing said respective optical signals onto said surface of said optical signal processing device through an optically transmissive wedge.

9. An optical system comprising:
a free-space optical signal directing arrangement which is operative to direct optical signals upon respective spatial locations of a surface of an optical signal processing device, said optical signal directing arrangement including a focusing element that focuses respective optical signals onto a curved focal surface having a shape that does not conform with a generally planar shape of said surface of said optical signal processing device, the curved focal surface being defined by a substantially planar auxiliary focal surface; and
an optical transform device installed between said optical signal directing arrangement and said optical signal processing device, and operative to modify transmission paths of said optical signals, to effectively impose a tilt on said substantially planar auxiliary focal surface and thereby effectively position said substantially planar auxiliary focal surface to be substantially coincident with said generally planar surface of said optical signal processing devices;
wherein said optical signal processing device is selected from a micro electro-mechanical array of mirrors, and a liquid crystal array.

10. The optical system according to claim 9, wherein said optical transform device comprises an optically transmissive wedge.

11. The optical system according to claim 10, wherein said optically transmissive wedge has a front and a rear surface through which the optical signals are transmitted, and at least one of the front and the rear surface is a curved surface.

12. The optical system according to claim 9, wherein said optical signal directing arrangement includes at least one of a focusing lens and a reflective surface of revolution.

13. The optical system according to claim 9, wherein said substantially planar auxiliary focal surface is a best fit planar surface approximation of said curved focal surface.

14. A configurable optical free space, wavelength selective optical device comprising:
a focusing arrangement having a curvilinear focal surface configured to focus optical signals onto a wavelength-selective dispersive device, said wavelength-selective dispersive device being operative to spatially distribute respective wavelength components of said optical signals onto said a curvilinear focal surface;
an M×N array of controllably positionable reflectors distributed over a generally planar surface; and
an optical transform device installed between said wavelength-selective dispersive device and said M×N array of controllably positionable reflectors, and being operative to modify transmission paths of said respective wavelength components, so as to produce an effective tilt of said curvilinear focal surface and thereby cause said curvilinear focal surface to be effectively coincident with said generally planar surface of said M×N array of controllably positionable reflectors.

15. The configurable optical free space, wavelength selective optical device according to claim 14, wherein said optical transform device comprises an optically transmissive wedge.

16. The configurable optical free space, wavelength selective optical device according to claim 15, wherein said optically transmissive wedge has a front and a rear surface through which the optical signals are transmitted, and at least one of the front and the rear surface is a curved surface.

17. The configurable optical free space, wavelength selective optical device according to claim 14, wherein said focusing arrangement includes at least one of a focusing lens and a reflective surface of revolution.

18. The configurable optical free space, wavelength selective optical device according to claim 14, wherein said curvilinear focal surface is defined by a substantially planar focal surface; and wherein said substantially planar focal surface is a best fit planar surface approximation of said curvilinear focal surface.

19. The configurable optical free space, wavelength selective optical device according to claim 18, wherein said array of controllably positionable reflectors is selected from a micro electro-mechanical array of mirrors, and a liquid crystal array.

* * * * *

UNITED STATES PATENT AND TRADEMARK OFFICE
CERTIFICATE OF CORRECTION

| | | |
|---|---|---|
| PATENT NO. | : 6,760,501 B2 | Page 1 of 16 |
| APPLICATION NO. | : 10/152733 | |
| DATED | : July 6, 2004 | |
| INVENTOR(S) | : Iyer et al. | |

It is certified that error appears in the above-identified patent and that said Letters Patent is hereby corrected as shown below:

The title page showing the illustrative figure should be deleted to be replaced with the attached title page.

Drawing sheets, consisting of figs. 1-16B, should be deleted to be replaced with the drawing sheets, consisting of figs. 1-16B, as shown on the attached page.

Signed and Sealed this

Twenty-sixth Day of February, 2008

JON W. DUDAS
*Director of the United States Patent and Trademark Office*

(12) United States Patent
Iyer et al.

(10) Patent No.: US 6,760,501 B2
(45) Date of Patent: Jul. 6, 2004

(54) DEVICE FOR IMPOSING A FIELD TILT FOR APPROXIMATING THE INHERENT FIELD CURVATURE OF A FOCUSING ELEMENT IN A FREE SPACE OPTICAL DEVICE

(75) Inventors: Rajiv Iyer, Ottawa (CA); Jacques Bismuth, Ottawa (CA)

(73) Assignee: JDS Uniphase Inc., Ottawa (CA)

(*) Notice: Subject to any disclaimer, the term of this patent is extended or adjusted under 35 U.S.C. 154(b) by 90 days.

(21) Appl. No.: 10/152,733

(22) Filed: May 23, 2002

(65) Prior Publication Data
US 2002/0141687 A1 Oct. 3, 2002

Related U.S. Application Data

(63) Continuation-in-part of application No. 09/729,270, filed on Dec. 5, 2000, now Pat. No. 6,498,872, which is a continuation-in-part of application No. 09/988,506, filed on Nov. 20, 2001, now Pat. No. 6,560,000, application No. 10/152,733.

(60) Provisional application No. 60/293,196, filed on May 25, 2001.

(51) Int. Cl.$^7$ ............... G02B 6/28; G02B 6/293; G02B 6/35
(52) U.S. Cl. ............... 385/16; 385/18; 385/24; 385/33; 385/37
(58) Field of Search ............... 385/16–18, 24, 385/31, 33, 37, 39, 47

(56) References Cited

U.S. PATENT DOCUMENTS

| | | | |
|---|---|---|---|
| 5,153,778 A | * | 10/1992 | Saslan-Alvarado ......... 359/742 |
| 6,415,080 B1 | * | 7/2002 | Sappey et al. ............. 385/37 |
| 6,498,872 B2 | * | 12/2002 | Bouevitch et al. ......... 385/24 |
| 2002/0067887 A1 | * | 6/2002 | Tomlinson et al. ......... 385/37 |

* cited by examiner

*Primary Examiner*—Hemang Sanghavi
*Assistant Examiner*—Omar Rojas
(74) *Attorney, Agent, or Firm*—Teitelbaum & MacLean; Neil Teitelbaum; Doug MacLean

(57) ABSTRACT

An optical beam path directing system has a field-flattening optically transmissive wedge installed in spatially dispersed beam paths upstream of the planar surface of a micro electro-mechanical switch (MEMS) or liquid crystal array. The parameters of the field-flattening wedge and its location in the diffracted beam paths are defined such that the wedge effectively rotates a 'best fit' planar surface approximation of the curvilinear focal plane of a concave reflector into coplanar coincidence with the optical signal-receiving surface of the MEMS. As a result, loss variation is essentially flat and minimized across the optical signal transmission band.

19 Claims, 12 Drawing Sheets

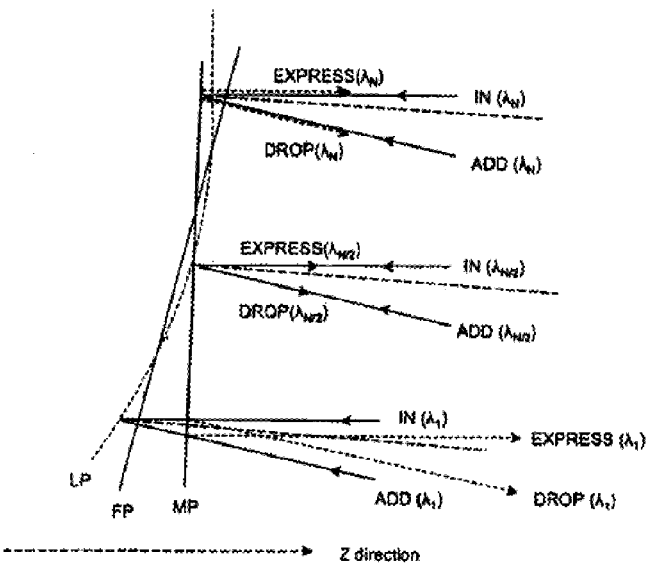

UNITED STATES PATENT AND TRADEMARK OFFICE
CERTIFICATE OF CORRECTION

PATENT NO.         : 6,760,501 B2
APPLICATION NO. : 10/152733
DATED              : July 6, 2004
INVENTOR(S)       : Iyer et al.

It is certified that error appears in the above-identified patent and that said Letters Patent is hereby corrected as shown below:

In the drawings, please replace the existing FIG. 1 with the following:

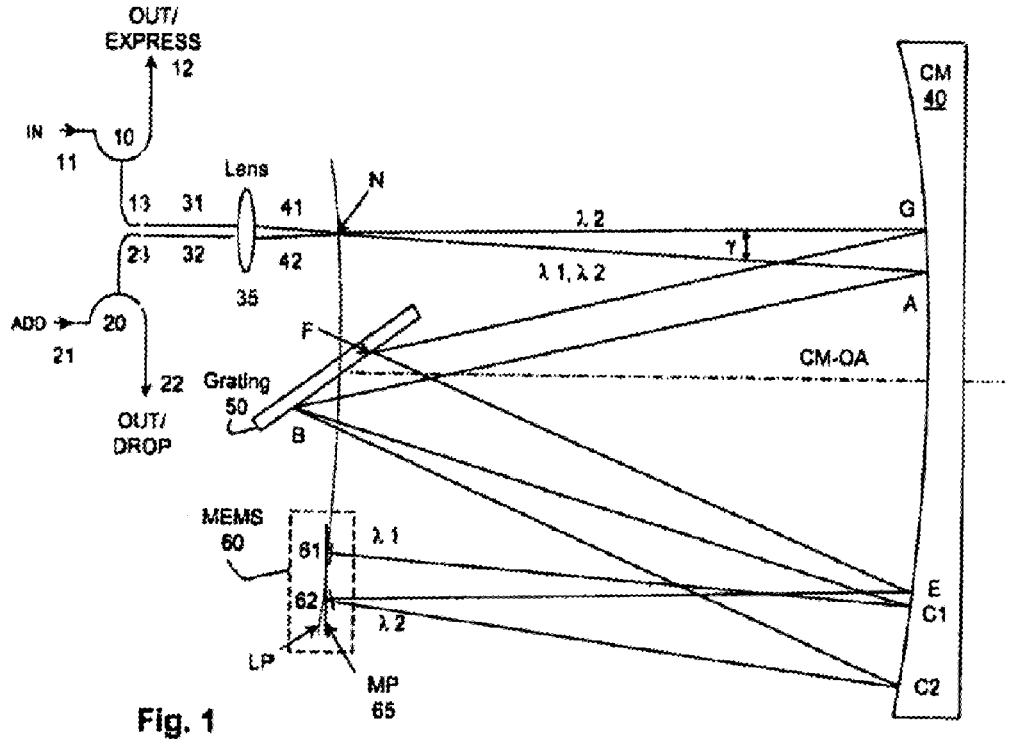

UNITED STATES PATENT AND TRADEMARK OFFICE
CERTIFICATE OF CORRECTION

PATENT NO.        : 6,760,501 B2
APPLICATION NO. : 10/152733
DATED                : July 6, 2004
INVENTOR(S)      : Iyer et al.

It is certified that error appears in the above-identified patent and that said Letters Patent is hereby corrected as shown below:

In the drawings, please replace the existing FIG. 2 with the following:

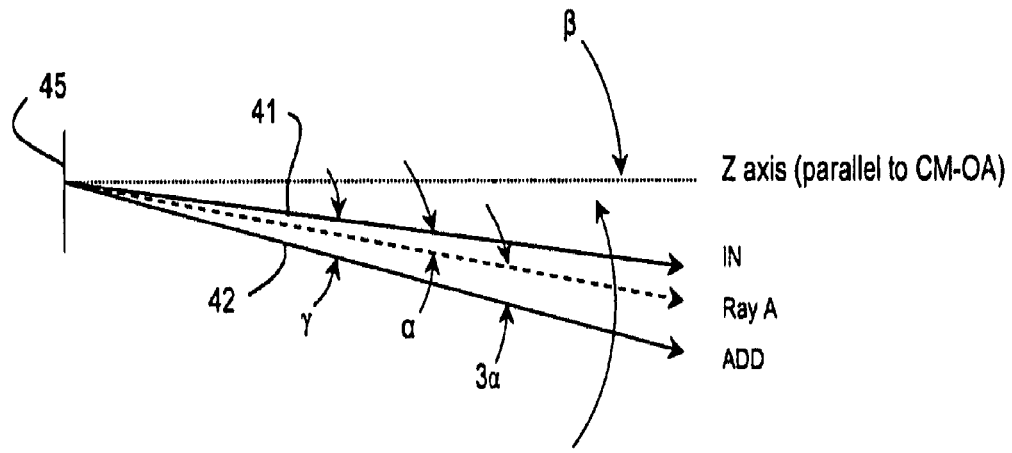

In the drawings, please replace the existing FIG. 3 with the following

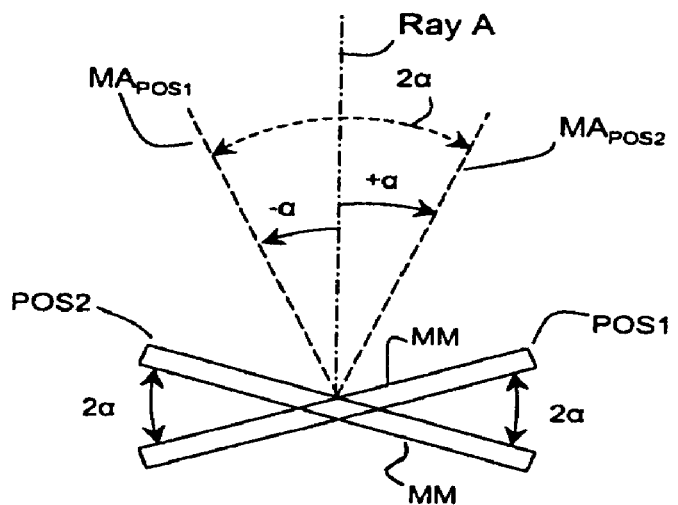

UNITED STATES PATENT AND TRADEMARK OFFICE
CERTIFICATE OF CORRECTION

| | |
|---|---|
| PATENT NO. | : 6,760,501 B2 |
| APPLICATION NO. | : 10/152733 |
| DATED | : July 6, 2004 |
| INVENTOR(S) | : Iyer et al. |

It is certified that error appears in the above-identified patent and that said Letters Patent is hereby corrected as shown below:

In the drawings, please replace the existing FIG. 4 with the following:

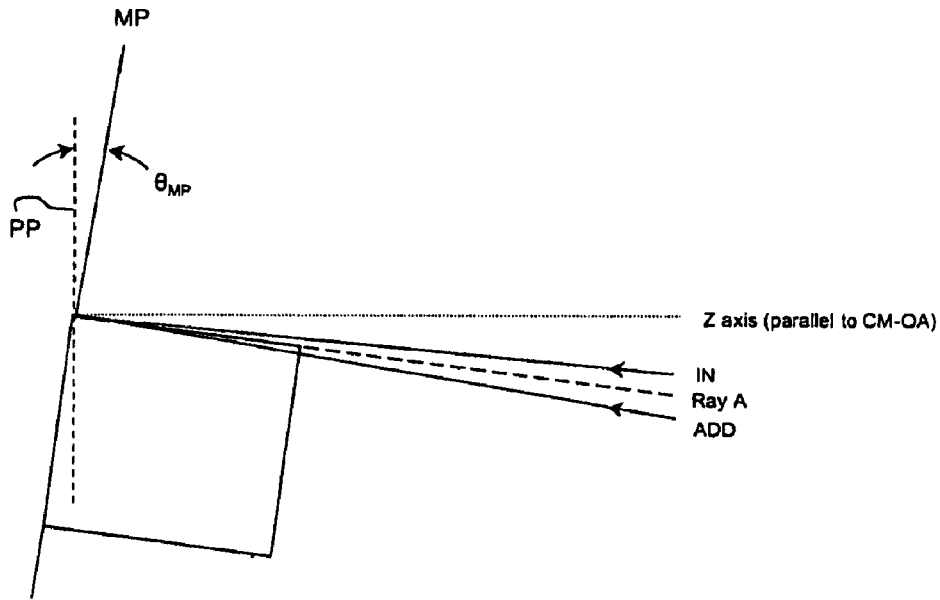

FIG. 4

UNITED STATES PATENT AND TRADEMARK OFFICE
CERTIFICATE OF CORRECTION

PATENT NO. : 6,760,501 B2
APPLICATION NO. : 10/152733
DATED : July 6, 2004
INVENTOR(S) : Iyer et al.

It is certified that error appears in the above-identified patent and that said Letters Patent is hereby corrected as shown below:

In the drawings, please replace the existing FIG. 5 with the following:

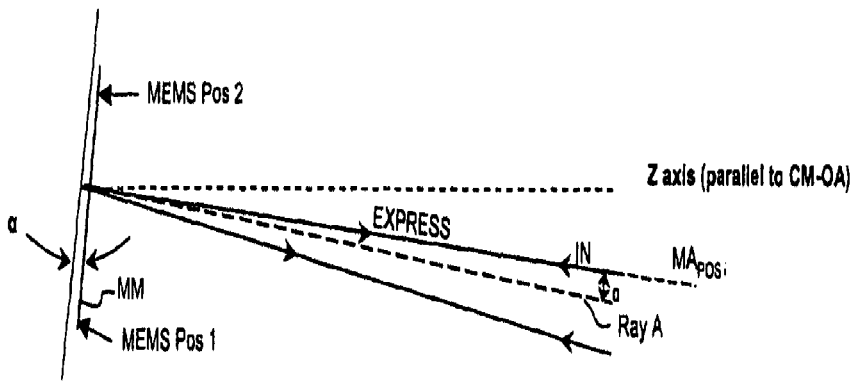

FIG. 5

In the drawings, please replace the existing FIG. 6 with the following:

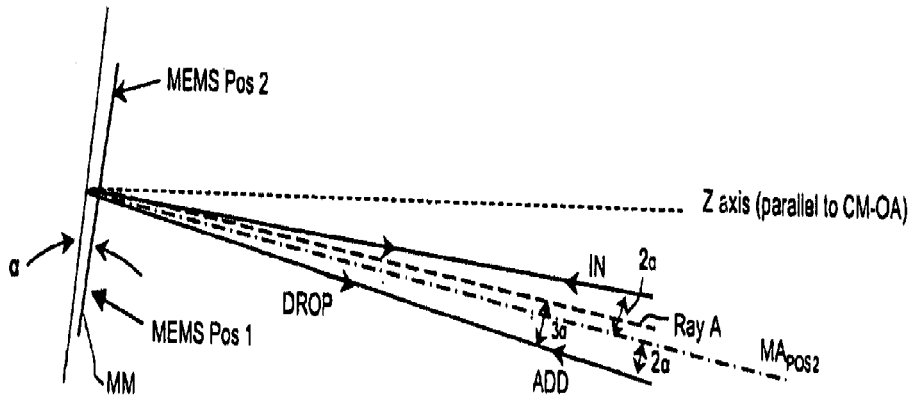

FIG. 6

UNITED STATES PATENT AND TRADEMARK OFFICE
CERTIFICATE OF CORRECTION

PATENT NO. : 6,760,501 B2
APPLICATION NO. : 10/152733
DATED : July 6, 2004
INVENTOR(S) : Iyer et al.

It is certified that error appears in the above-identified patent and that said Letters Patent is hereby corrected as shown below:

In the drawings, please replace the existing FIG. 7 with the following:

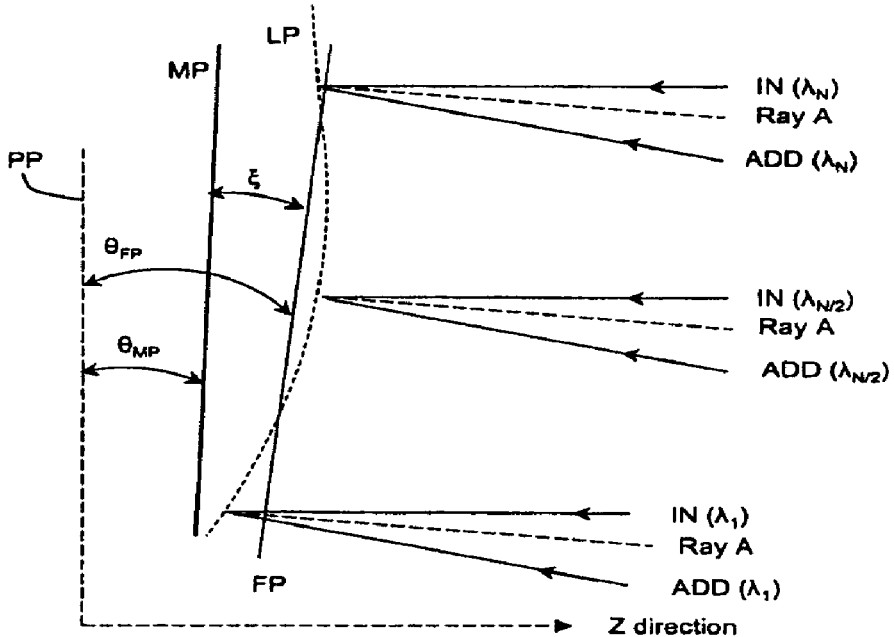

UNITED STATES PATENT AND TRADEMARK OFFICE
CERTIFICATE OF CORRECTION

PATENT NO. : 6,760,501 B2  Page 8 of 16
APPLICATION NO. : 10/152733
DATED : July 6, 2004
INVENTOR(S) : Iyer et al.

It is certified that error appears in the above-identified patent and that said Letters Patent is hereby corrected as shown below:

In the drawings, please replace the existing FIG. 8 with the following:

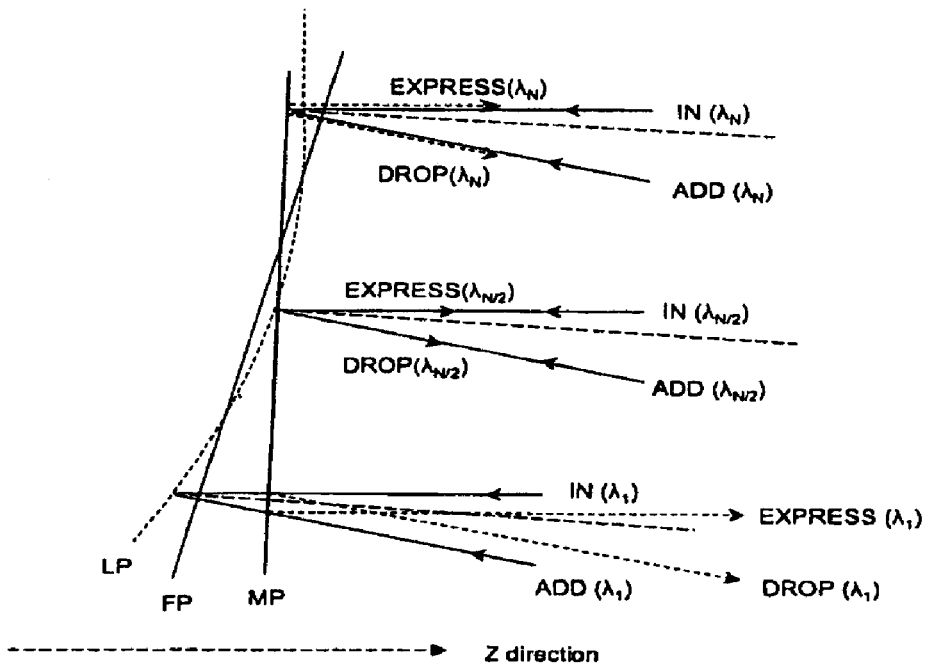

UNITED STATES PATENT AND TRADEMARK OFFICE
CERTIFICATE OF CORRECTION

PATENT NO. : 6,760,501 B2
APPLICATION NO. : 10/152733
DATED : July 6, 2004
INVENTOR(S) : Iyer et al.

It is certified that error appears in the above-identified patent and that said Letters Patent is hereby corrected as shown below:

In the drawings, please replace the existing FIG. 9 with the following:

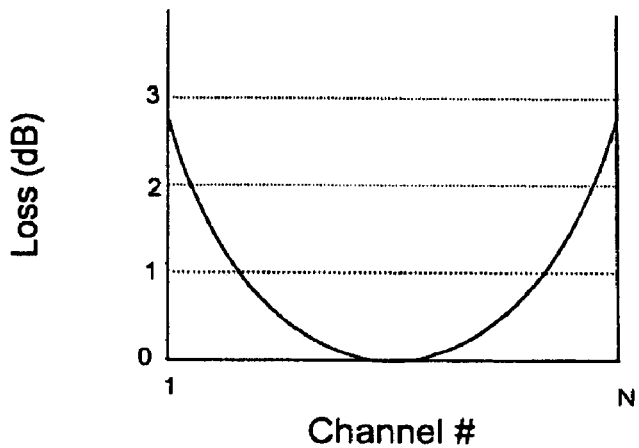

FIG. 9

UNITED STATES PATENT AND TRADEMARK OFFICE
CERTIFICATE OF CORRECTION

| | | |
|---|---|---|
| PATENT NO. | : 6,760,501 B2 | Page 10 of 16 |
| APPLICATION NO. | : 10/152733 | |
| DATED | : July 6, 2004 | |
| INVENTOR(S) | : Iyer et al. | |

It is certified that error appears in the above-identified patent and that said Letters Patent is hereby corrected as shown below:

In the drawings, please replace the existing FIG. 10 with the following

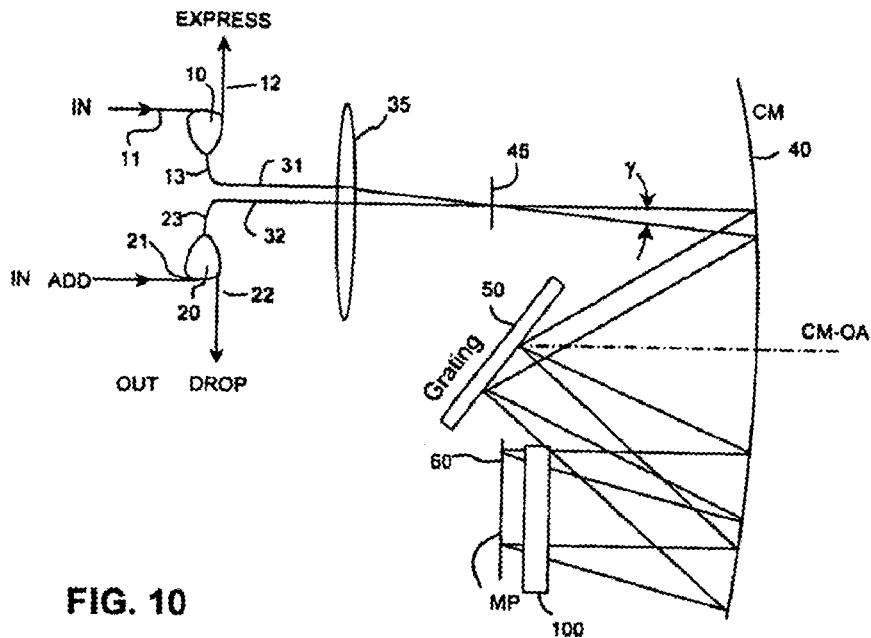

FIG. 10

UNITED STATES PATENT AND TRADEMARK OFFICE
CERTIFICATE OF CORRECTION

PATENT NO. : 6,760,501 B2
APPLICATION NO. : 10/152733
DATED : July 6, 2004
INVENTOR(S) : Iyer et al.

Figure 11A:
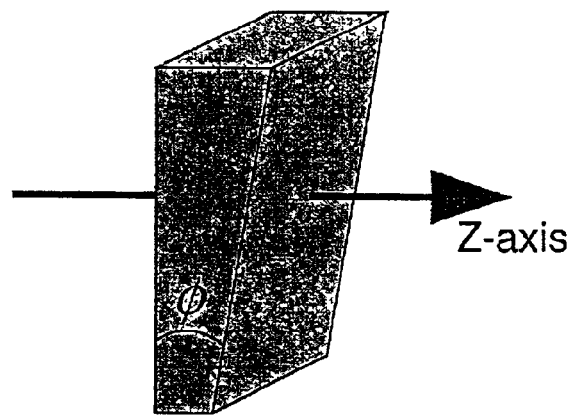
FIG. 11A shows a transmission wedge that may be employed as the transmission path correction element in the COADM of FIG. 10.
Figure 11B:
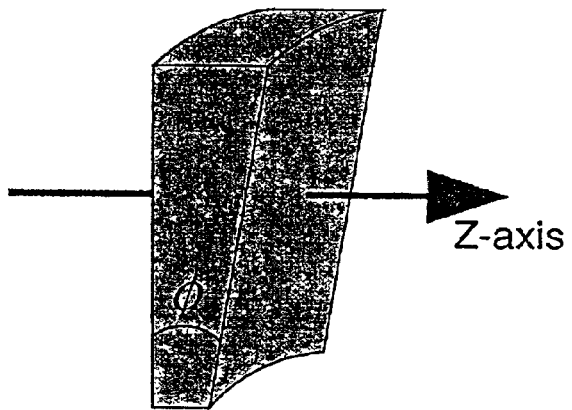
FIGS. 11B and 11C show variants of the transmission wedge of FIG. 11A.
Figure 11C:
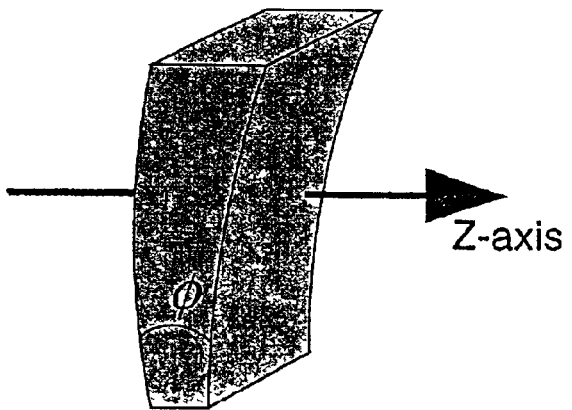

It is certified that error appears in the above-identified patent and that said Letters Patent is hereby corrected as shown below:

In the drawings, please replace the existing FIG. 11A with the following:

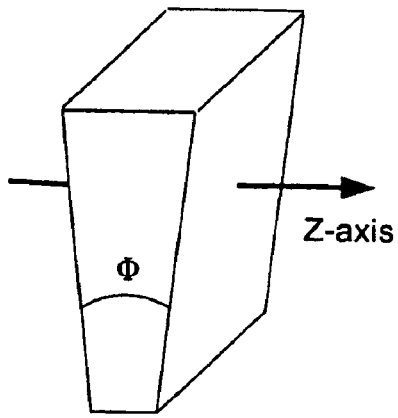

FIG. 11A

In the drawings, please replace the existing FIG. 11B with the following:

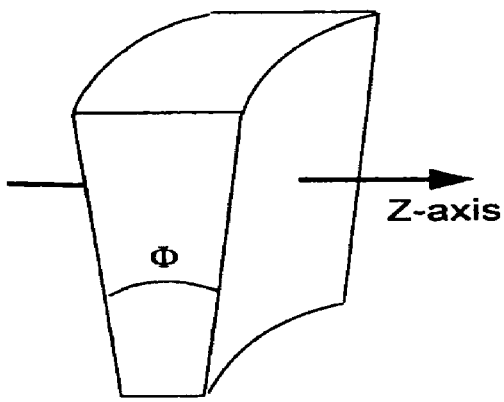

FIG. 11B

UNITED STATES PATENT AND TRADEMARK OFFICE
CERTIFICATE OF CORRECTION

PATENT NO. : 6,760,501 B2
APPLICATION NO. : 10/152733
DATED : July 6, 2004
INVENTOR(S) : Iyer et al.

It is certified that error appears in the above-identified patent and that said Letters Patent is hereby corrected as shown below:

In the drawings, please replace the existing FIG. 11C with the following:

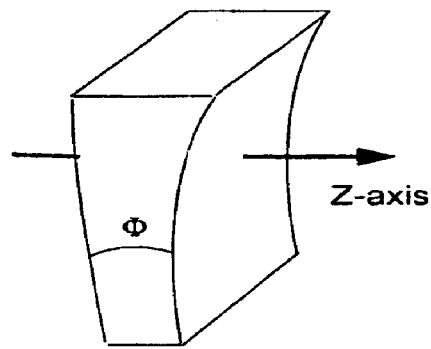

FIG. 11C

In the drawings, please replace the existing FIG. 12 with the following:

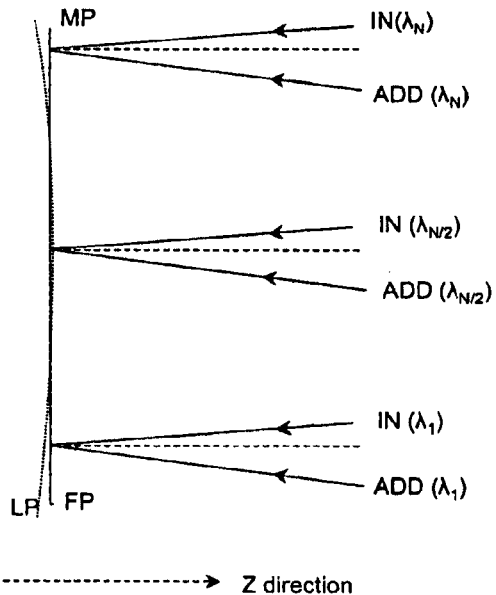

FIG. 12

UNITED STATES PATENT AND TRADEMARK OFFICE
CERTIFICATE OF CORRECTION

PATENT NO.         : 6,760,501 B2
APPLICATION NO. : 10/152733
DATED                : July 6, 2004
INVENTOR(S)       : Iyer et al.

It is certified that error appears in the above-identified patent and that said Letters Patent is hereby corrected as shown below:

In the drawings, please replace the existing FIG. 13 with the following:

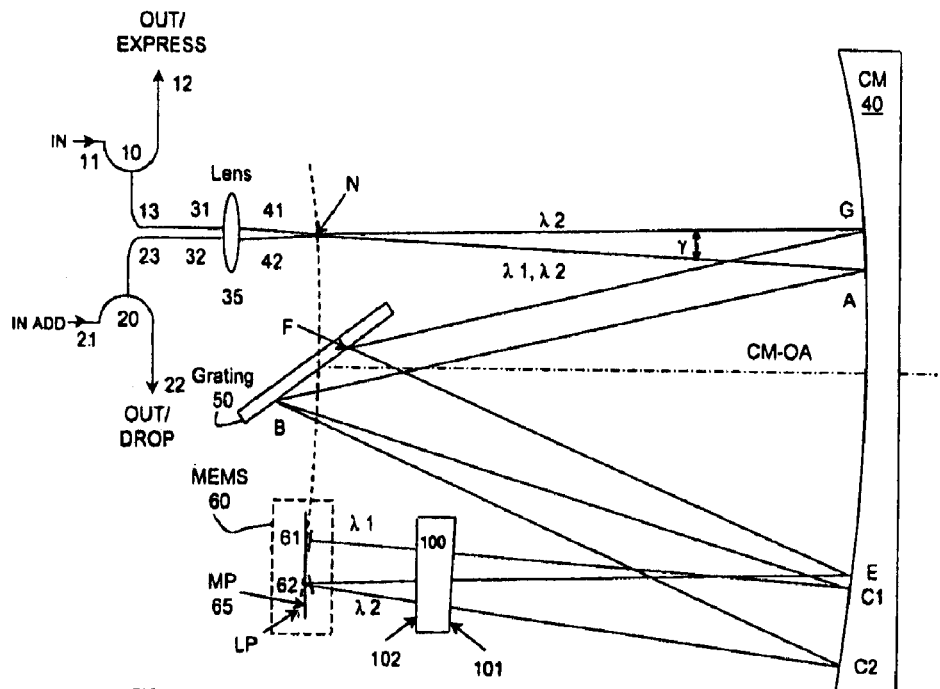

Fig. 13

UNITED STATES PATENT AND TRADEMARK OFFICE
CERTIFICATE OF CORRECTION

PATENT NO.        : 6,760,501 B2
APPLICATION NO.   : 10/152733
DATED             : July 6, 2004
INVENTOR(S)       : Iyer et al.

It is certified that error appears in the above-identified patent and that said Letters Patent is hereby corrected as shown below:

In the drawings, please replace the existing FIG. 14 with the following:

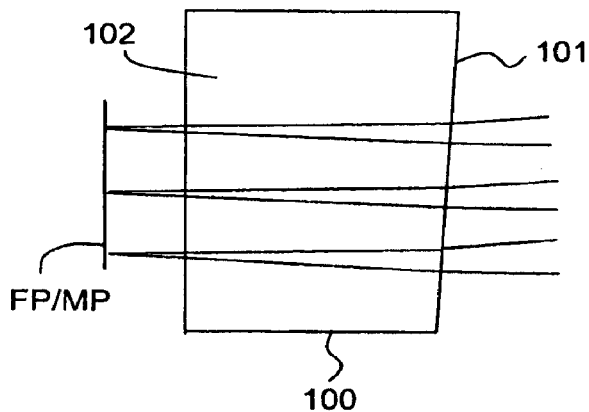

FIG. 14

In the drawings, please replace the existing FIG. 15 with the following:

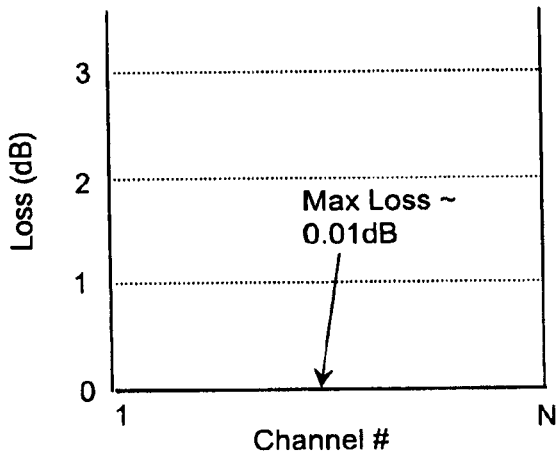

FIG. 15

UNITED STATES PATENT AND TRADEMARK OFFICE
CERTIFICATE OF CORRECTION

PATENT NO.       : 6,760,501 B2
APPLICATION NO.  : 10/152733
DATED            : July 6, 2004
INVENTOR(S)      : Iyer et al.

It is certified that error appears in the above-identified patent and that said Letters Patent is hereby corrected as shown below:

In the drawings, please replace the existing FIG. 16A with the following:

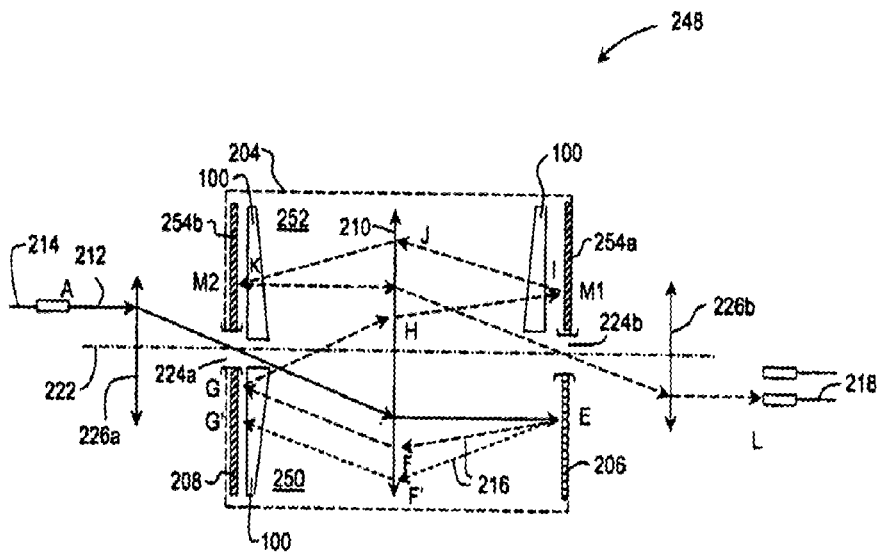

FIG. 16A

UNITED STATES PATENT AND TRADEMARK OFFICE
CERTIFICATE OF CORRECTION

PATENT NO.        : 6,760,501 B2
APPLICATION NO. : 10/152733
DATED             : July 6, 2004
INVENTOR(S)       : Iyer et al.

It is certified that error appears in the above-identified patent and that said Letters Patent is hereby corrected as shown below:

In the drawings, please replace the existing FIG. 16B with the following:

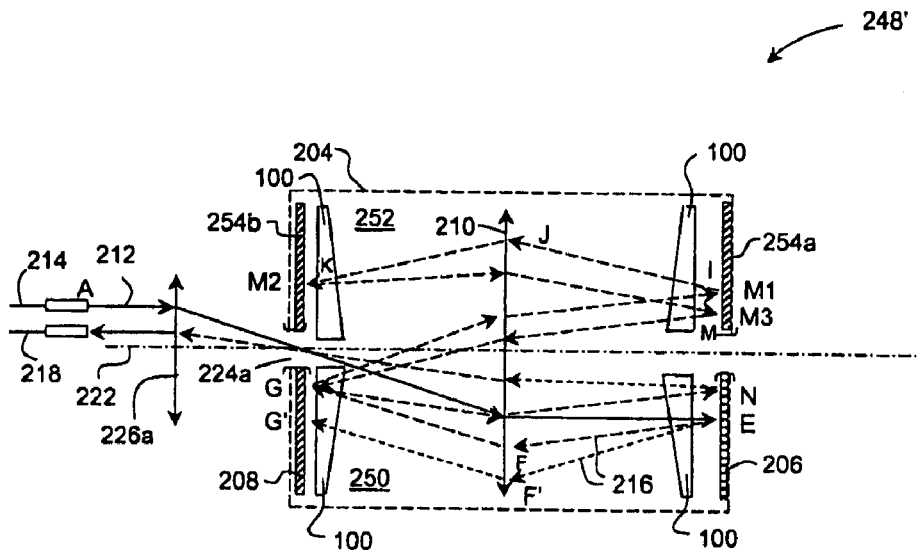

FIG. 16B